(12) United States Patent
Minamihara et al.

(10) Patent No.: US 11,977,789 B2
(45) Date of Patent: May 7, 2024

(54) DISPLAY SCREEN GENERATION APPARATUS, DISPLAY APPARATUS, DISPLAY SCREEN GENERATION METHOD, AND NON-TRANSITORY COMPUTER-READABLE STORAGE MEDIUM STORING DISPLAY SCREEN GENERATION PROGRAM FOR IMPROVING PROCESS MANAGEMENT SCREEN

(71) Applicant: SEIKO EPSON CORPORATION, Tokyo (JP)

(72) Inventors: Tetsuyuki Minamihara, Sapporo (JP); Kana Ogawa, Sapporo (JP); Toshiaki Kimura, Sapporo (JP); Yoshiki Katsuma, Sapporo (JP); Yuto Fukuchi, Matsumoto (JP); Ayako Kobayashi, Okaya (JP); Satoru Ono, Shiojiri (JP); Yuichi Sugiyama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/820,516

(22) Filed: Aug. 17, 2022

(65) Prior Publication Data
US 2023/0059926 A1    Feb. 23, 2023

(30) Foreign Application Priority Data

Aug. 20, 2021 (JP) .................................. 2021-134778
Mar. 28, 2022 (JP) .................................. 2022-051305

(51) Int. Cl.
*G06F 3/12* (2006.01)

(52) U.S. Cl.
CPC ............ *G06F 3/1207* (2013.01); *G06F 3/121* (2013.01); *G06F 3/124* (2013.01); *G06F 3/1259* (2013.01)

(58) Field of Classification Search
None
See application file for complete search history.

(56) References Cited

U.S. PATENT DOCUMENTS

| | | |
|---|---|---|
| 9,449,018 B1 | 9/2016 | Ma et al. |
| 10,754,706 B1 | 8/2020 | Mo et al. |
| 11,567,716 B2 | 1/2023 | Kawasaki et al. |
| 2002/0057455 A1* | 5/2002 | Gotoh .................... G06F 3/1207 358/1.15 |
| 2003/0076525 A1 | 4/2003 | Hikawa |
| 2010/0290080 A1 | 11/2010 | Klassen |
| 2014/0355031 A1 | 12/2014 | Fukuda |
| 2014/0368866 A1* | 12/2014 | Kikumoto ............. G06F 3/1288 358/1.15 |

(Continued)

FOREIGN PATENT DOCUMENTS

| | | |
|---|---|---|
| JP | 2016-184895 A | 10/2016 |
| JP | 2020-155118 A | 9/2020 |

*Primary Examiner* — Henok Shiferaw
(74) *Attorney, Agent, or Firm* — WORKMAN NYDEGGER

(57) ABSTRACT

A display screen generation apparatus includes: an acquisition portion acquiring for each of a plurality of print products produced through a plurality of processes, progress of the processes; and a display portion generating a display screen that displays for each of the plurality of print products, the process waiting to be executed, the process being executed, the process already executed, and the process not intended to be executed in a distinguishable manner from each other.

12 Claims, 11 Drawing Sheets

(56) References Cited

U.S. PATENT DOCUMENTS

| | | | |
|---|---|---|---|
| 2015/0138596 A1 | 5/2015 | Kikuchi | |
| 2016/0292543 A1 | 10/2016 | Oishi | |
| 2017/0060506 A1 | 3/2017 | Krikke et al. | |
| 2018/0063366 A1* | 3/2018 | Mori | H04N 1/00424 |
| 2018/0088875 A1 | 3/2018 | Yoshida | |
| 2018/0097950 A1 | 4/2018 | Sagata | |
| 2019/0079785 A1* | 3/2019 | Hori | G06F 8/34 |
| 2019/0369932 A1* | 12/2019 | Yamasaki | G06F 3/1207 |
| 2020/0278819 A1 | 9/2020 | Yamasaki | |
| 2020/0293239 A1* | 9/2020 | Kawasaki | G06F 3/1207 |
| 2020/0301638 A1* | 9/2020 | Fukui | G06F 3/1263 |
| 2020/0406643 A1 | 12/2020 | Komazawa et al. | |
| 2021/0019097 A1 | 1/2021 | Sawata et al. | |
| 2021/0286571 A1 | 9/2021 | Betsuyaku et al. | |
| 2021/0294548 A1 | 9/2021 | Kawasaki et al. | |
| 2022/0011736 A1 | 1/2022 | Ishimura | |
| 2022/0035589 A1* | 2/2022 | Sawata | G06F 3/1243 |
| 2022/0156018 A1* | 5/2022 | Matsui | G06F 3/1207 |
| 2022/0405025 A1* | 12/2022 | Minamihara | G06F 3/1275 |
| 2023/0054855 A1* | 2/2023 | Fukuchi | G06F 3/1256 |
| 2023/0058455 A1 | 2/2023 | Fukuchi et al. | |

* cited by examiner

FIG. 6

| PROCESS GROUP INFORMATION LIST | | | | | | | | | | | |
|---|---|---|---|---|---|---|---|---|---|---|---|
| PROCESS GROUP NAME | PROCESS GROUP AA | | PROCESS GROUP BB | | | | PROCESS GROUP CC | | | | |
| INTER-SYSTEM COOPERATION FLAG | OFF | | ON | | | | OFF | | | | |
| PROCESS INFORMATION LIST | PROCESS NAME | PRESTART | PROOFREADING | SETTING | COLOR-MATCHING | PRINT QUEUE | PRINTING | PRINT FINISHED | LAMINATE | PANEL | EYELETING | COMPLETION |
| | PROCESS MANAGEMENT ID | A1 | A2 | B1 | B2 | B3 | B4 | C1 | C2 | C3 | C4 | C5 |

FIG. 7

| FILE INFORMATION | | MATTER A | | | | | | | | MATTER E | | | | |
|---|---|---|---|---|---|---|---|---|---|---|---|---|---|---|
| MATTER NAME | | MATTER A | | | | | | | | MATTER E | | | | |
| FILE NAME | | aaa.pdf | | | | | | | | eee.pdf | | | | |
| DELIVERY DATE | | MM/DD/YYYY hh:mm | | | | | | | | MM/DD/YYYY hh:mm | | | | |
| NUMBER OF COPIES | | 1500 | | | | | | | | 3000 | | | | |
| NOTE | | - | | | | | | | | - | | | | |
| ACTIVE PROCESS MANAGEMENT ID | | C5 | | | | | | | | B4 | | | | |
| PROCESS SETTING INFORMATION LIST | PROCESS MANAGEMENT ID | A1 | A2 | B1 | B2 | B3 | B4 | ... | C5 | ... | A1 | ... | B4 | ... |
| | DISABLE FLAG | OFF | OFF | OFF | ON | OFF | OFF | ... | OFF | ... | OFF | ... | - | ... |
| JOB INFORMATION LIST | PRINT JOB ID | - | - | - | - | - | - | ... | - | ... | - | ... | JOB001 | JOB002 |
| | SERIAL NUMBER | - | - | - | - | - | - | ... | - | ... | - | ... | #*****3 | #*****4 |
| | PRINT SETTING | - | - | - | - | - | - | ... | - | ... | - | ... | ***** | ***** |
| | NUMBER OF COPIES | - | - | - | - | - | - | ... | - | ... | - | ... | 1500 | 1500 |
| | ESTIMATED PRINT COMPLETION TIME | - | - | - | - | - | - | ... | - | ... | - | ... | 17:00 | 17:15 |

FIG. 8

| PRINTER INFORMATION | PRINTER NAME | printer1 | printer2 | ... |
| --- | --- | --- | --- | --- |
| | MODEL NAME | Prt-2000 | Prt-2000 | ... |
| | SERIAL NUMBER | #*****1 | #*****2 | ... |
| | STATUS | PRINTING | ERROR HAS OCCURRED | ... |
| | ERROR INFORMATION | — | ERROR #1 | ... |
| | NOTICE INFORMATION | — | — | ... |

DISPLAY SCREEN GENERATION APPARATUS, DISPLAY APPARATUS, DISPLAY SCREEN GENERATION METHOD, AND NON-TRANSITORY COMPUTER-READABLE STORAGE MEDIUM STORING DISPLAY SCREEN GENERATION PROGRAM FOR IMPROVING PROCESS MANAGEMENT SCREEN

The present application is based on, and claims priority from JP Application Serial Number 2022-051305, filed Mar. 28, 2022 and JP Application Serial Number 2021-134778, filed Aug. 20, 2021, the disclosures of which are hereby incorporated by reference herein in their entirety.

BACKGROUND

1. Technical Field

The present disclosure relates to a display screen generation apparatus, a display apparatus, a display screen generation method, and a non-transitory computer-readable storage medium storing a display screen generation program.

2. Related Art

Process management techniques used in producing a finished product through a plurality of processes have been known. For example, JP-A-2020-155118 discloses a system that performs printing and cutting processes based on a file representing a submitted document to produce a bound finished product.

The above-described general technique includes displaying on a UI screen, progress information (not-detected, in operation, finished, or alert) of work processes for each of plural jobs. There is a desire to further improve such a process management screen.

SUMMARY

A display screen generation apparatus includes: an acquisition portion acquiring for each of a plurality of print products produced through a plurality of processes, progress of the processes; and a display portion generating a display screen that displays for each of the plurality of print products, the process waiting to be executed, the process being executed, the process already executed, and the process not intended to be executed in a distinguishable manner from each other.

A display apparatus includes: an acquisition portion acquiring for each of a plurality of print products produced through a plurality of processes, progress of the processes; and a display portion displaying for each of the plurality of print products, the process waiting to be executed, the process being executed, the process already executed, and the process not intended to be executed in a distinguishable manner from each other.

A display screen generation method includes the steps of: acquiring for each of a plurality of print products produced through a plurality of processes, progress of the processes; and generating a display screen that displays for each of the plurality of print products, the process waiting to be executed, the process being executed, the process already executed, and the process not intended to be executed in a distinguishable manner from each other.

A non-transitory computer-readable storage medium storing a display screen generation program causes a computer to function as: an acquisition portion acquiring for each of a plurality of print products produced through a plurality of processes, progress of the processes; and a display portion generating a display screen that displays for each of the plurality of print products, the process waiting to be executed, the process being executed, the process already executed, and the process not intended to be executed in a distinguishable manner from each other.

BRIEF DESCRIPTION OF THE DRAWINGS

FIG. 6 is a diagram illustrating an example of process list information.

FIG. 7 is a diagram illustrating an example of file information.

FIG. 8 is a diagram illustrating an example of printer information.

DESCRIPTION OF EXEMPLARY EMBODIMENTS

Embodiments of the present disclosure will be described in the following order.
1. System Configuration:
1-1. Configuration of Server:
1-2. Configuration of Terminal:
1-3. Configuration of Printer:
2. Process Management:
2-1. Process Management Screen:
3. Display Screen Generation Processing:
4. Other Embodiment:

1. System Configuration

Figure 1:
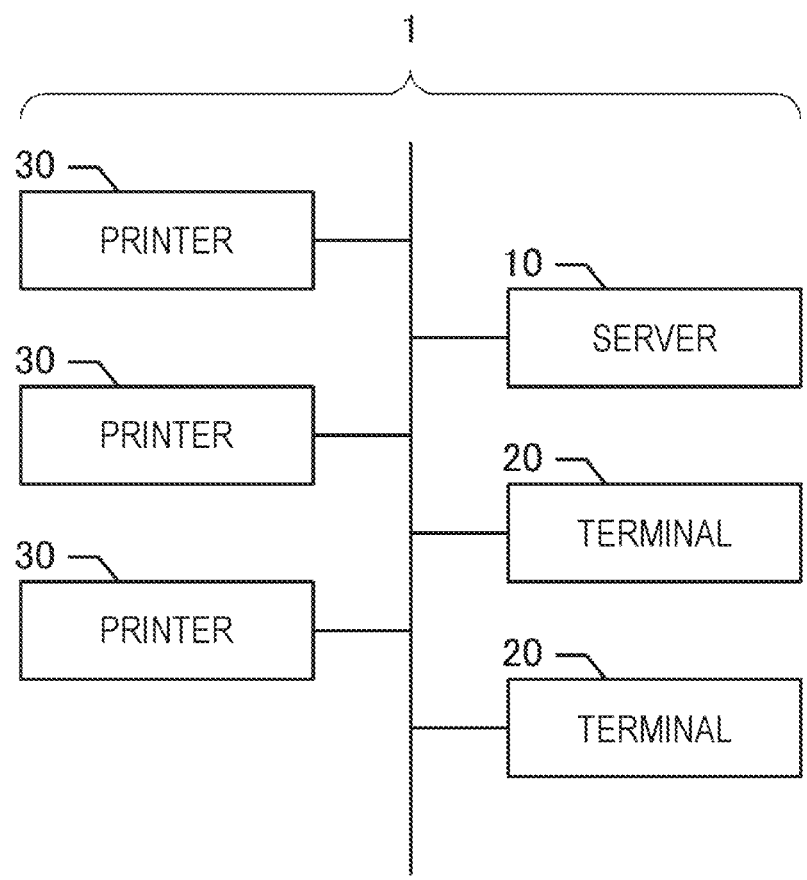
FIG. 1 is a diagram schematically illustrating an example of a production system.

FIG. 1 is a diagram schematically illustrating an example of a production system according to an embodiment of the present disclosure. A production system 1 includes a server 10, a terminal 20, and a printer 30. In this embodiment, the number of devices illustrated in the drawing is an example, and the number of devices included in the production system 1 is not limited. For example, the terminal 20 and printer 30 are illustrated as plural terminals 20 and plural printers 30 in FIG. 1, and the numbers of these devices are not limited to those illustrated in FIG. 1. The server 10, which is illustrated as one server 10 in FIG. 1, may include two or more servers 10. These devices can communicate with each other via a network. The configuration of the network may take various forms. The network may be a local network or may be a network through which devices located at physically separated positions communicate with each other, such as the Internet.

In this embodiment, a user who performs production management or production operation receives a production request from a requester. The user operates the terminal 20 to input information indicating the content of the request. The terminal 20 transmits the information to the server 10. The server 10 controls the printer 30 in order to perform the requested production.

In this embodiment, the production system 1 is a system that produces a print product. The production system 1 performs specified post-processing, including surface treatment, for a print product printed based on a file indicating a print target, thus producing a finished product corresponding to the file. When the files indicating print targets are different from each other, the production system 1 produces different print products and then provide different finished products. On the other hand, when repeating the processing of the same processes based on the same file, the production system 1 can produce a plurality of identical finished products.

The production system 1 according to the embodiment is able to print based on any file that indicates a print target and produce any number of finished products based on a single file. In other words, the production system 1 is able to produce as many print products as desired by a requester who requests the production of the finished product so that the print products have the content desired by the requester. In this embodiment, the unit of request is referred to as a matter. In this embodiment, the content of one matter is specified based on one file. For example, the production system 1 receives two files from the same requester and produces a finished product based on the received two files. This means that the production system 1 receives a request for two matters from the requester. The production system 1 can produce any number of finished products based on one file, and the number thereof may vary for each matter.

Hereinafter, the configuration of each device of the production system 1 capable of performing such a display is described.

1-1. Configuration of Server

Figure 2:
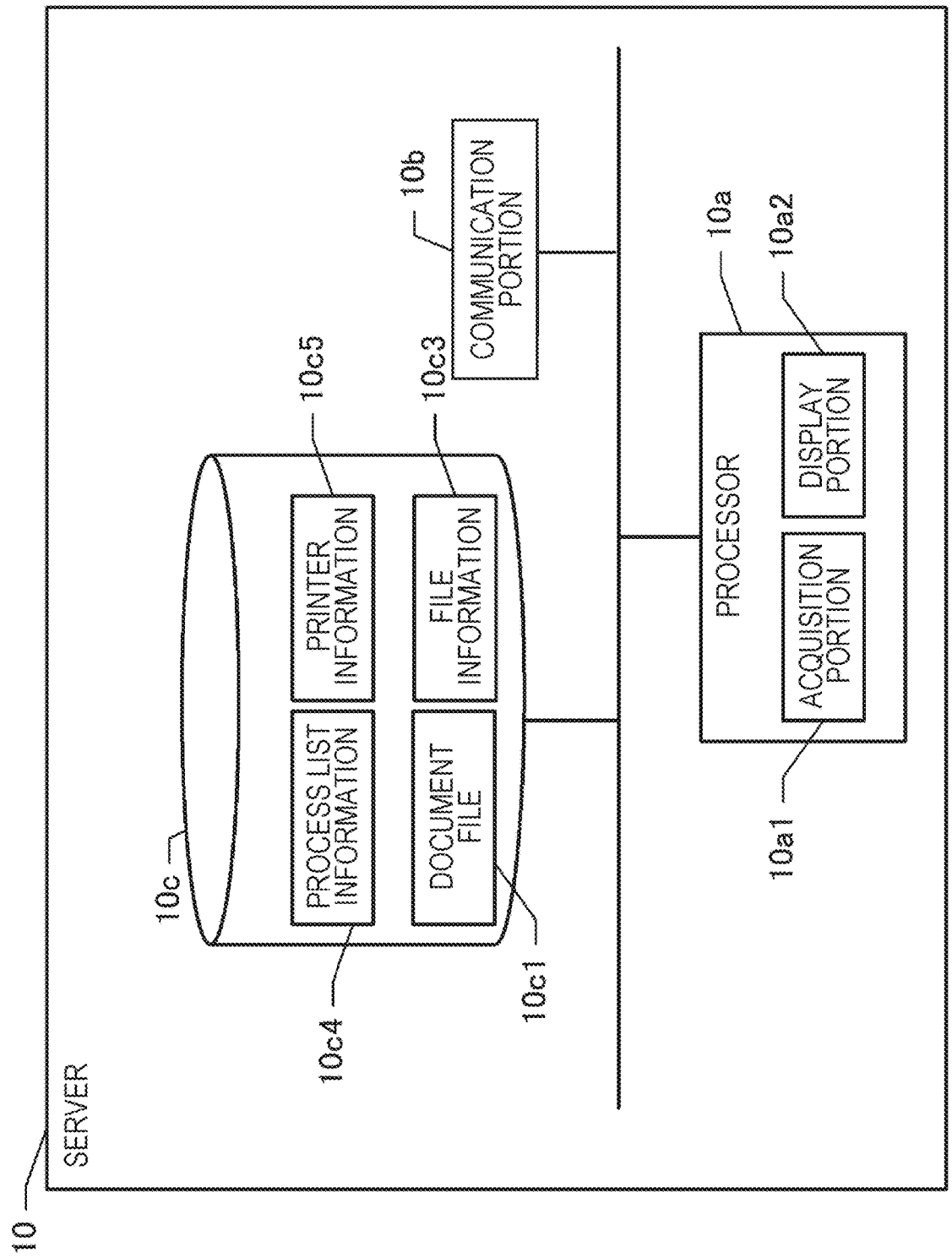
FIG. 2 is a block diagram illustrating the configuration of a server.

FIG. 2 is a block diagram illustrating the configuration of the server 10. The server 10 includes a processor 10a, a communication portion 10b, a non-volatile memory 10c, The processor 10a includes a CPU, a ROM, and a RAM and the like (not illustrated) and executes various programs recorded in the non-volatile memory 10c to control each portion of the server 10 and each device connected to the network. The processor 10a may be composed of a single chip or a plurality of chips. The processor 10a may be composed of a SoC with various functional blocks operating printers. The server 10 may include an ASIC instead of the CPU or may include the CPU and an ASIC that cooperate with each other, for example. When each device of the embodiment includes a processor, the processor can be implemented in various forms like the processor 10a.

The communication portion 10b includes a communication interface for communication with an external device according to various wired or wireless communication protocols. The server 10 is able to communicate with other devices via the communication portion 10b. The communication portion 10b may include an interface for communication with various removable memories mounted on the server 10.

The non-volatile memory 10c of the server 10 stores various information. For example, the non-volatile memory 10c contains a document file 10c1 representing a finished product. The document file 10c1 is a file containing data representing the content to be printed on a print product for production of the finished product. For example, the document file 10c1 can be a pdf file or the like.

Furthermore, the non-volatile memory 10c stores file information 10c3. The file information 10c3 contains the file name of a file to be printed, the matter name, the delivery date, the number of copies, and the like. The file information 10c3 is described in detail later with reference to FIG. 7.

Furthermore, the non-volatile memory 10c stores process list information 10c4. The process list information 10c4 is information that defines processes for producing a print product. The process list information 10c4 is described in detail later with reference to FIG. 6. The non-volatile memory 10c stores printer information 10c5. The printer information 10c5 is information holding the current status and the like of each of a plurality of printers used to produce print products. The printer information 10c5 is described in detail later with reference to FIG. 8. In this embodiment, the file information 10c3, process list information 10c4, and printer information 10c5 are used to generate a later-described process management screen. The processor 10a serves as an acquisition portion 10a1 that acquires the progress of processes for each matter. The processor 10a also serves as a display portion 10a2 that generates a displayed screen (the process management screen) that displays for each matter, a process waiting to be executed, a process being executed, a process already executed, and a process not intended to be executed in a distinguishable manner.

1-2. Configuration of Terminal

Figure 3:
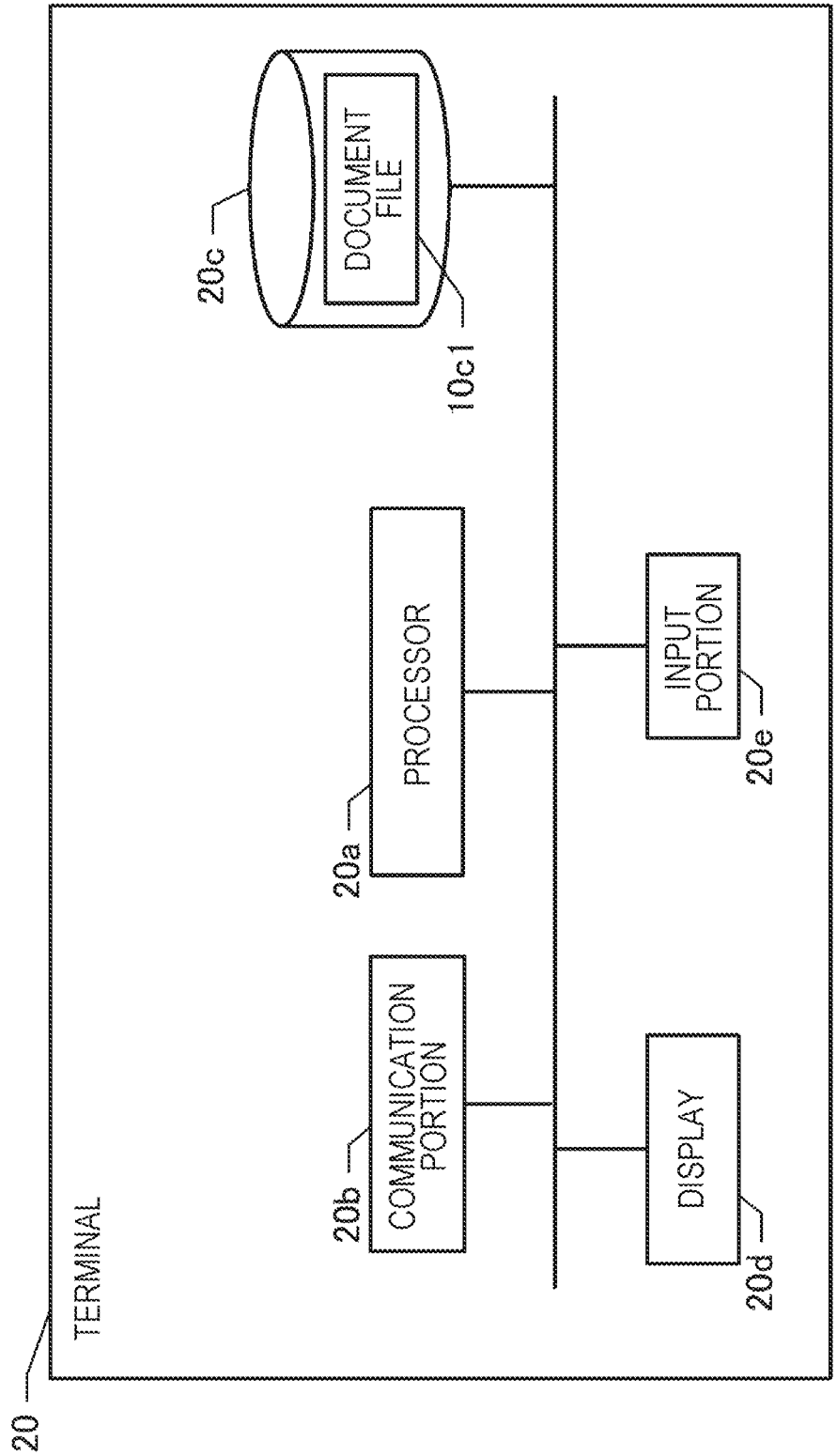
FIG. 3 is a block diagram illustrating the configuration of a terminal.

FIG. 3 is a block diagram illustrating the configuration of the terminal 20. The terminal 20 includes a processor 20a, a communication portion 20b, a non-volatile memory 20c, a display 20d, and an input portion 20e. The processor 20a includes a CPU, a ROM, a RAM, or the like (not illustrated) and executes various programs recorded in the non-volatile memory 20c to control each portion of the terminal 20.

The communication portion 20b includes a communication interface for communication with external devices according to various wired or wireless communication protocols. The terminal 20 is able to communicate with other devices via the communication portion 20b. The communication portion 20b may include an interface for communication with various removable memories mounted on the terminal 20.

In the non-volatile memory 20c of the terminal 20, the document file 10c1 representing a matter is recorded. The document file 10c1 may be recorded in the non-volatile memory 20c in any manner. For example, the document file 10cl, which is prepared by a requester who requested the production of a finished product, may be recorded in a removable memory and may be transferred from the removable memory to the non-volatile memory 20c via the communication portion 20b. Alternatively, the document file 10c1 may be acquired from an external device via a network. Furthermore, the user may create the document file 10c1 with an application program or the like by using the terminal 20 and record the document file 10c1 in the non-volatile memory 20c. Of course, the document created by the requester may be edited by the user and then recorded in the non-volatile memory 20c as the document file 10cl. At inputting a matter, the user specifies the matter by the file name of the document file 10c1 recorded in the non-volatile memory 20c. When the matter is inputted, the document file 10c1 is transferred to the server 10. These files may be temporarily stored in a volatile memory of the terminal 20, then transferred to the server 10, and stored in the non-volatile memory 10c of the server 10 for a long period of time.

The display 20d is a display apparatus configured to display any image. The input portion 20e is a device at which the user performs input operations. The input portion 20e is composed of a keyboard, a mouse, a touch panel, or the like, for example. In any case, the user is able to operate the input portion 20e to input user's intension while visually recognizing images and characters displayed on the display 20d. In this embodiment, the user uses the display 20d and input portion 20e of the terminal 20 as a user interface to input the above-described setting information and visually recognize the later-described process management screen.

1-3. Configuration of Printer

Figure 4:
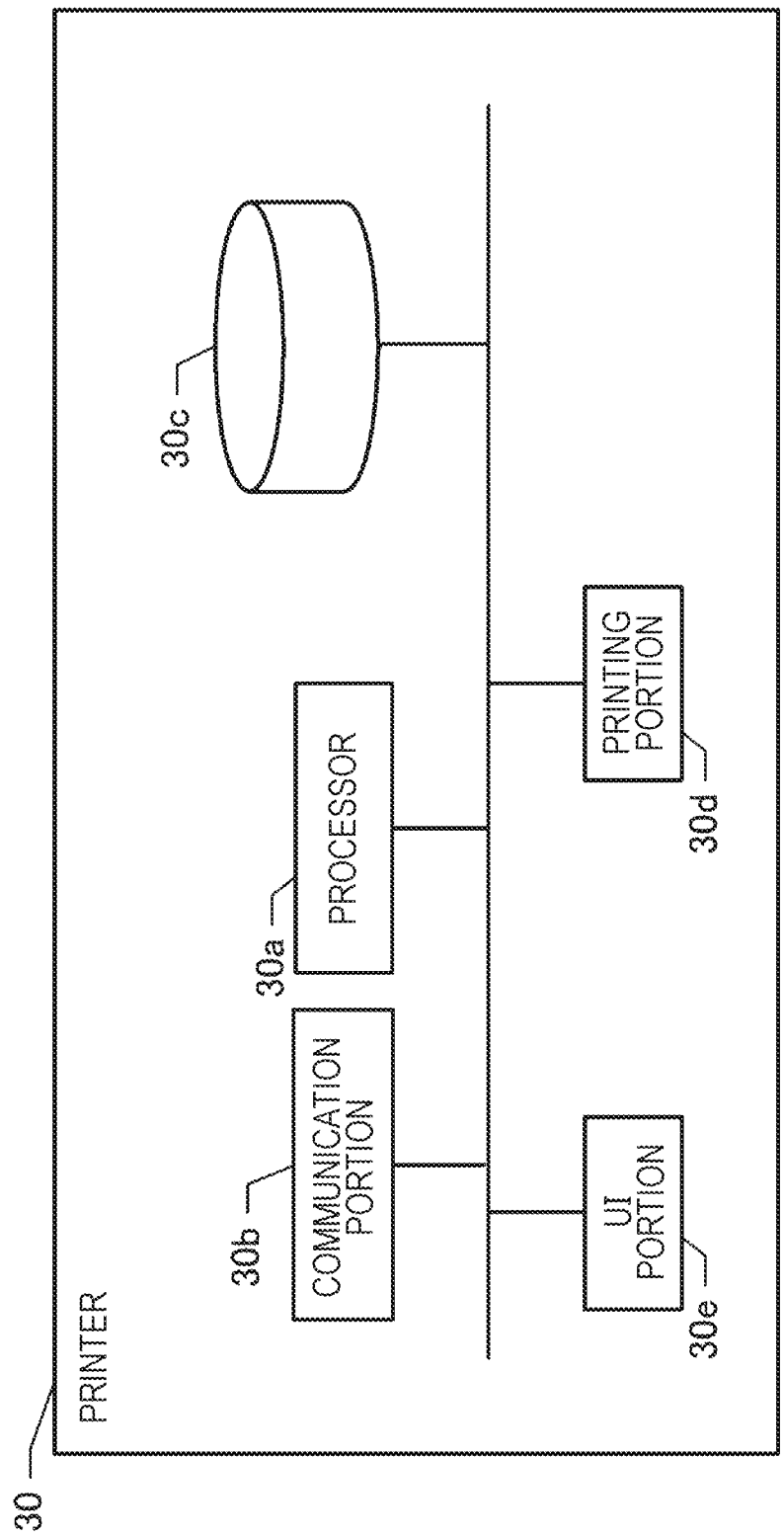
FIG. 4 is a block diagram illustrating the configuration of a printer.

FIG. 4 is a block diagram illustrating the configuration of the printer 30. The printer 30 includes a processor 30a, a communication portion 30b, a non-volatile memory 30c, a printing portion 30d, and a UI portion 30e. The processor 30a includes a CPU, a ROM, a RAM, or the like (not illustrated) and executes various programs recorded in the non-volatile memory 30c to control each portion of the printer 30.

The communication portion 30b includes a communication interface for communication with external devices according to various wired or wireless communication protocols. The printer 30 is able to communicate with other devices via the communication portion 30b. The communication portion 30b may include an interface for communication with various removable memories mounted on the printer 30.

The printing portion 30d is a portion executing printing. The printing portion 30d may employ various printing methods, such as ink jet printing or electrophotographic printing. The printing portion 30d includes an actuator and various devices, such as sensors, drivers, and mechanical components, for executing printing on various media. The sensors include sensors detecting various detection targets that can change in the printer 30. The detection targets are not limited, and examples of the sensors are a sensor detecting the amount of remaining media and a sensor detecting the amount of remaining ink of each color used for printing.

The UI portion 30e includes a touch panel display, various keys and switches, and the like. The touch panel display includes a display panel that displays various information, including the status of the printer 30 and the amount of remaining ink, for example, and a touch detection panel laid on the display panel. The touch panel display detects a touch operation by a human finger or the like. The processor 30a can acquire the content of the user's operation through the UI portion 30e. The processor 30a can display various information on the display of the UI portion 30e to notify the user of the information.

In this embodiment, the printer 30 includes plural printers 30, which are installed in a facility owned by a printing company and are able to perform the printing of plural matters in parallel according to plural requests from plural requesters. The server 10 associates the processing order of print jobs of the matters with each of the plural printers 30. The server 10 then instructs each printer 30 to start the printing of the matters according to the corresponding processing order. At this time, the server 10 performs various types of image processing based on the document file 10c1 as the print target and outputs print data indicating the content to be printed, to the printer 30 via the communication portion 10b. The processor 30a of the printer 30 acquires the print data via the communication portion 30b, controls the printing portion 30d based on the print data, and performs the printing. When the printing is finished, the processor 30a outputs information indicating that the printing is finished via the communication portion 30b to the server 10. When the server 10 acquires the information via the communication portion 10b, the processor 10a specifies the matter to be processed following the matter for which the printing is finished and makes an instruction to start the printing of the specified matter.

2. Process Management

As described above, in the production system 1 according to the embodiment, the plural devices operate in parallel in a situation where plural matters to produce finished products through plural processes coexist therein. In this embodiment, therefore, the production system 1 provides a list that the user can easily understand in order to comprehend the state of production in the production system 1.

For the display concerning process management, the server 10 and terminal 20 cooperate in this embodiment. The processor 20a of the terminal 20 controls the display 20d to display a predetermined reception screen thereon and accepts information inputted by the user, in accordance with the information outputted from the input portion 20e. The information inputted by the user contains items, including the matter name, the delivery date, the number of copies, processes intended to be performed, and print settings.

The information inputted by the user is transmitted to the server 10 via the communication portion 20b. When the processor 10a of the server 10 acquires the transmitted information, the processor 10a records the information in the non-volatile memory 10c.

At the transmission of the inputted information, the processor 20a transmits the document file 10c1 indicated by the inputted information, that is, the document file 10c1 specified by the matter name, to the server 10. The processor 10a of the server 10 acquires the document file 10c1 via the communication portion 10b and records the same in the non-volatile memory 10c. The file name of the document file 10c1 is recorded in the file information 10c3.

As described above, when the server 10 receives the information concerning a matter from the terminal 20, the processor 10a associates the first process among the plural processes to produce the print product with the process being executed of the matter. The production system 1 according to the embodiment is able to present to the user, the process management screen listing the progress of processes of plural matters.

2-1. Process Management Screen

Figure 5:
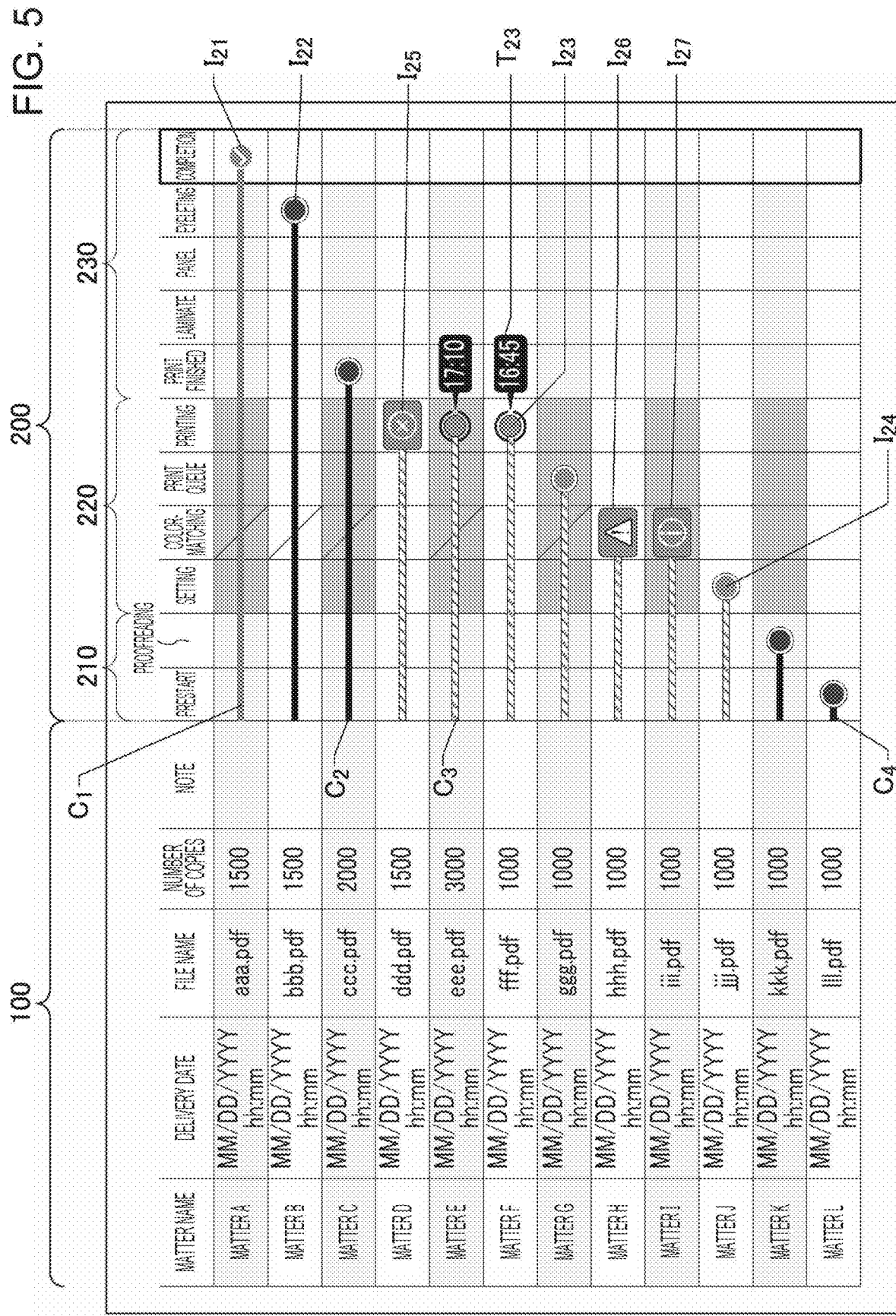
FIG. 5 is a diagram illustrating an example of a process management screen.

FIG. 5 is a diagram illustrating an example of the process management screen. In the process management screen of the embodiment, matters are arranged vertically in rows, and a matter information portion 100 and a progress chart portion 200 are arranged horizontally. The matter information portion 100 includes information concerning each matter, and the progress chart portion 200 includes the progress of the matter. That is, in the process management screen, information of the same matter is arranged horizontally, and information of different matters is arranged vertically. In the matter information portion 100, the matter name, the delivery date, the file name, the number of copies, and a note are displayed for each matter. In the progress chart portion 200, plural processes are arranged in execution order in a list. In this embodiment, the processes are arranged in execution order such that each process be executed prior to the processes on the right thereof.

The processes assumed in this embodiment are eleven processes including: a prestart process, a proofreading process, a setting process, a color-matching process, a print queue process, a printing process, a print finished process, a laminate process, a panel process, an eyeleting process, and a completion process, which are displayed in the progress chart portion 200. The prestart process corresponds to the starting process among the aforementioned processes. The process management screen includes rectangular regions indicating the respective processes of each matter. In the regions corresponding to the processes being executed, active process icons ($I_{21}$, $I_{22}$, $I_{23}$, $I_{24}$, and the like) are displayed. Each active process icon contains a circular figure indicating that the process is being executed. The circular figures contained in the active process icons $I_{21}$, $I_{22}$, $I_{23}$, and $I_{24}$ correspond to a first figure.

In the process management screen, bars ($C_1$, $C_2$, $C_3$, $C_4$, and the like) are displayed. Each bar is extended from the region of the starting process (the prestart process in this embodiment), which is the first process among all the processes, to the region of the process being executed. As the production proceeds in each matter, the corresponding bar stretches rightward from the starting process. The left end of the bar is in contact with the left end of the rectangle corresponding to the starting process while the right end of the bar is in contact with an icon, such as the active process icon displayed in the region of the process being executed or a later-described error icon.

Each bar has a smaller thickness than the vertical length of the regions corresponding to the processes. The user is therefore able to still visually recognize the background of the regions where the bar is displayed. The regions that the bar passes through are regions on the left of the region where the active process icon is displayed, indicating the processes already executed, except for processes not intended to be executed as described later. The regions that the bar does not pass through are regions on the right of the region where the active process icon is displayed, indicating the processes waiting to be executed, except for processes not intended to be executed as described later.

In this embodiment, the processes not intended to be executed are denoted by diagonal lines in the corresponding regions. In the example illustrated in FIG. 5, diagonal lines are displayed in the regions corresponding to the color-matching process in the matters A, B, C, E, and G, indicating that the color-matching process is not executed in the production of these matters A, B, C, E, and G. In this embodiment, when a process downstream of a process not intended to be executed (denoted by a diagonal line) is being executed, the bar is also displayed in the region of the process not intended to be executed. Such a diagonal line in the region of the process not intended to be executed can be visually recognized even when the bar is displayed in the region. The user is therefore able to visually recognize that the process was not executed. In this embodiment, as described above, the process management screen contains processes with diagonal lines displayed in the regions and processes with no diagonal lines displayed in the regions in order to distinguish the processes not intended to be executed from the processes intended to be executed. The user is thereby able to recognize whether each process is intended to be executed, based on the presence of the diagonal line.

In this embodiment, the processes are divided into three process groups 210, 220, and 230. In the example illustrated in FIG. 5, the process group 210 includes the prestart and proofreading processes, the process group 220 includes the setting process through the printing process, and the process group 230 includes the print finished process through the completion process.

The prestart and proofreading processes of the process group 210 correspond to a pre-processing process performed prior to the processes (the process group 220) that are executed in cooperation with the printer 30. The prestart and proofreading processes are manual transition processes each of which manually transitions to the subsequent process based on an operation of the user to proceed with the production. In this example, the process section from the prestart and proofreading processes is also referred to as a manual transition section. The operation of the user to proceed with the production includes clicking the region of the process to which a manual transition process is intended to transition, in the screen of FIG. 5, in this embodiment. At acquiring from the terminal 20, information indicating that the operation of the user to proceed with the production was performed, the processor 10*a* serves as the acquisition portion 10*a*1.

The prestart process is a process representing that the matter has just been registered. The prestart process is a starting process among all of the processes in the example illustrated in FIG. 5. For proofreading of the document file 10*c*1 corresponding to the matter, the user operates the mouse of the terminal 20 and clicks the region of the subsequent proofreading process. When detecting clicking the region of the proofreading process in a matter where the process being executed is the prestart process, the processor 20*a* transmits to the server 10, information indicating the transition of the process being executed from the prestart process to the proofreading process and moves the active process icon of the target matter from the region of the prestart process to the region of the proofreading process. Based on the information transmitted from the terminal 20, the server 10 transitions the process being executed in the target matter from the prestart process to the proofreading process. Specifically, the processor 10*a* updates the value stored in an active process management ID (see FIG. 7) in the file information 10*c*3 to a value indicating the proofreading process.

When finishing the proofreading work, the user clicks the region of the subsequent setting process. When detecting clicking the region of the setting process in a matter where the process being executed is the proofreading process, the processor 20*a* transmits to the server 10, the information indicating the transition of the process being executed from the proofreading process to the setting process and moves the active process icon of the target matter from the region of the proofreading process to the region of the setting process. Based on the information transmitted from the terminal 20, the server 10 transitions the process being executed of the target matter from the proofreading process to the setting process.

In this embodiment, the four processes from the setting process to the printing process are executed in cooperation with the printer 30 and are automatic transition processes each of which automatically transitions to the subsequent process when having completed its execution. Specifically, the processor 10*a* acquires the progress of each process based on information transmitted from the printer 30. When the information transmitted from the printer 30 indicates that the process has completed its execution, the processor 10*a* automatically makes a transition to the process subsequent to the process having completed its execution. The process section from the setting process to the printing process is also referred to as the system cooperation section. At acquiring the progress-related information transmitted from the printer 30, the processor 10*a* serves as the acquisition portion 10*a*1.

The setting process is a process of waiting for the user to complete the work of setting the printing conditions. The user operates the UI portions of the terminal 20 or printer 30 to set the printing conditions of the target matter. When detecting that the setting is completed, the processor 10*a* transitions the process being executed to the subsequent color-matching process. The processor 10*a* transmits to the terminal 20, information indicating the transition of the process being executed in the target matter to the color-matching process. Based on the transmitted information, the processor 20*a* of the terminal 20 moves the active process icon of the target matter to the region of the color-matching process. The color-matching process is a process of, in the case of using spot color, for example, printing a color matching pattern and measuring colors of the printed pattern to adjust a color conversion LUT or the like. The processor 10*a* acquires the results of color measurement by a color measurement device. When it is determined based on the results of color measurement that colors requested by the requester are reproduced, the processor 10*a* makes a transition to the subsequent print queue process.

The print queue process is a process of waiting for the printing to start. Specifically, the print queue process is a process of waiting for the printer 30 assigned to a print job of the target matter, to be ready for starting the execution of the print job of the target matter. For example, if one printer is assigned with a plurality of print jobs and the first print job in printing order has not yet completed, the process being executed in the matters corresponding to the second or subsequent print jobs in printing order is the print queue process. When the print job of the target matter becomes the first job in printing order, the printer 30 is considered to be ready for starting the print job of the target matter. Alternatively, the printer 30 may be considered to be ready for starting a print job when the user performs preparation work, such as changing media, for the printer 30 and then inputs the start of the print job. In any case, when acquiring from the printer 30 or the like, the information indicating that the printer 30 is ready for starting the print job, the processor 10*a* transitions the process being executed to the subsequent printing process, and the terminal 20 accordingly moves the active process icon to the region of the printing process. The assignment or printers 30 to execute the color-matching process or execute the printing process is performed so as to select the printer 30 that is able to execute printing of the target matter and is able to be ready for starting the printing within the shortest amount of time based on the printing conditions of the target matter or the like, for example. The assignment may be performed such that the printing of one matter be distributed and executed in plural printers 30.

The printing process is a process of executing the printing of the document file 10*c*1 of the target matter. When acquiring from the printer 30, the information indicating completion of the printing of the document file 10*c*1, the processor 10*a* automatically transitions the process being executed to the subsequent print finished process, and the terminal 20 accordingly moves the active process icon to the region of the print finished process.

The five processes from the print finished process to the completion process belonging to the process group 230 are post-processing processes executed after the processes executed in cooperation with the printer 30 (the process group 220) and are the manual transition processes, each of which manually transitions to the subsequent process in response to an operation of the user to proceed with the production. In this example, the process section from the print finished process to the completion process is also referred to as the manual transition section.

The print finished process is a process to which the printing process for the document file 10*c*1 corresponding to the target matter automatically transitions when completed. When the process of laminating a printed medium is intended to be executed in the target matter, the user clicks the region of the laminate process. When detecting clicking the region of the subsequent laminate process in a matter where the process being executed is the print finished process, the processor 20*a* transmits to the server 10, the information indicating the transition of the process being executed from the print finished process to the laminate process and moves the active process icon of the target matter from the region of the print finished process to the region of the laminate process. Hereinafter, in a similar manner, when completing the work of each process, the user performs an operation to move the active process icon to the region of the subsequent process. Upon this operation, the active process icon moves to the region of the subsequent process. The server 10 updates the process being executed in the target matter. When completing the last eyeleting process, the user performs an operation to move the active process icon to the region of the completion process. Upon this operation, the active process icon moves to the region of the completion process, and the server 10 updates the process being executed in the target matter.

The active process icon $I_{21}$ illustrated in FIG. 5 is an icon displayed in the region of the completion process for a matter in which all the processes intended to be executed are completed. The active process icon $I_{21}$, which is displayed in the region of the completion process, is a circular figure with a check mark inside. The color within the circular figure thereof is different from the color of the active process icons in the regions of the processes other than the completion process. Based on the color of the active process icons and the form inside the figure thereof, the user can easily distinguish the state where all the processes of the target matter have completed from the state where all the processes of the target matter have not yet completed.

When the printing process is being executed, as indicated by the active process icon $I_{23}$, a frame is displayed to emphasize the outline of the circular figure (the first figure) indicating the process being executed. When the printing process is being executed, therefore, the user easily comprehends that the target matter has progressed to the printing process. Furthermore, when the printing process is being executed, the estimated completion time of the printing process is displayed in a predetermined display area corresponding to the active process icon. In this embodiment, the predetermined display area is positioned on the post-process side of the active process icon in the same row as the matter in which the printing process is being executed. In the display area set in such a manner, a balloon ($I_{23}$, for example) pointing the active process icon of the printing process is displayed, and in the balloon, the estimated completion time of the printing process is displayed. By displaying the estimated completion time of the printing process in the display area that corresponds to the active process icon displayed in the region of the printing process in such a manner, the user easily focuses on the estimated completion time of the printing process. Furthermore, since the display area of the estimated completion time is located on the post-process side of the region of the printing process that is being executed, the display of the estimated completion time cannot hide the bar of the target matter and also cannot hide any icons and any bars of the other matters. The estimated completion time of the printing process may be configured to be displayed when the mouse cursor is hovered over the active process icon of the printing process in a matter where the printing process is being executed and not to be displayed in other cases.

In this embodiment, as illustrated in FIG. 5, the background color of odd-numbered rows is gray while the background color of even-numbered rows is white. The different background colors between the odd- and the even-numbered rows in such a manner help the user recognize the correspondence between the matter information portion 100 and the progress chart portion 200 in the same matter. In this embodiment, in each of the rows (odd-numbered rows) with the gray background, the background color of the regions of the automatic transition processes (the system cooperation section, the process group 220) is different from that of the regions of the manual transition processes (the manual transition section, the process groups 210 and 230). The background color of the system cooperation section is gray with a lower brightness than that of the manual transition section. The different background colors of the automatic transition processes and the manual transition processes in such a manner help the user distinguish the section including a series of automatic transition processes (the system cooperation section, the process group 220) from the section including a series of manual transition processes (the manual transition section, the process groups 210 and 230). Of course, the process management screen may be configured such that the background colors of the even- and odd-numbered rows be different from each other and the background color of the regions of the automatic transition processes be different from that of the manual transition processes in the even-numbered rows.

Furthermore, the bar extended from the region of the starting process to the region of the process being executed is displayed with solid fill when the process being executed is the manual transition process ($C_1$, $C_2$, and $C_4$, for example). The bar is displayed with hatching fill when the process being executed is the automatic transition process ($C_3$, for example). This helps the user more easily recognize whether the process being executed is the automatic transition process or the manual transition process. The bar of a matter for which all the processes are completed, like a matter A in FIG. 5, may be displayed in a different color from the bar of a matter that has not yet reached the completion process (the former is displayed in achromatic color, or gray, while the latter is displayed in chromatic color, for example). Such a configuration helps the user more easily distinguish a matter for which all the processes are completed from a matter not having reached the completion process.

When an error occurs in a process being executed, a figure indicating the error is displayed in the region of the process being executed. The processor 10a specifies the matter and process in which the error has occurred based on the information transmitted from the printer 30. An icon Its in FIG. 5 is an error icon example that is displayed when an error occurred in the printing process. An icon $I_{26}$ is an error icon example that is displayed when an error occurred in the color-matching process. The error icons may have various display forms depending on the content of the error and the process in which the error has occurred. When an error has occurred in the process being executed, a bar extended from the region of the starting process to the region of the process in which the error has occurred is displayed. Since the error icons $I_{25}$ and $I_{26}$ can be displayed only in the regions of the automatic transition processes, the bars are displayed with hatching fill.

When an event that is to be notified to the user occurs, a figure indicating the presence of information to be notified is displayed in the region of the process being executed. Based on the information transmitted from the printer 30, the processor 10a specifies the matter and process that have notice information to be notified of the user. An icon $I_{27}$ in FIG. 5 is an icon example indicating the presence of notice information. When the process being executed has notice information to be notified, a bar extended from the region of the starting process to the region of the process having the notice information is displayed. Since the notice icon $I_{27}$ can be displayed only in the regions of the automatic transition processes, the bar is displayed with hatching fill.

The process list information 10c4, file information 10c3, and printer information 10c5, which are referred to for displaying the process management screen described above, will be sequentially described in detail. FIG. 6 is a diagram illustrating an example of the process list information 10c4. The process list information 10c4 defines plural processes to produce a print product. In the process list information 10c4, the processes are recorded in layout order in the process management screen (in execution order). Each process is assigned with a process management ID. In association with each process management ID, a process name of the process indicated by the process management ID is recorded. The process name is used to display the name of each process in the progress chart portion 200 in FIG. 5.

Each process belongs to any process group. The process groups are identified by process group names. In this example, the prestart process with a process management ID of A1 belongs to a process group AA, the printing process with a process management ID of B4 belongs to a process group BB, and the laminate process with a process management ID of $C_2$ belongs to a process group CC. In the process list information 10c4, a value of an inter-system cooperation flag is recorded for each process group. The value of the inter-system cooperation flag indicating ON represents that the process group of interest is a process group composed of automatic transition processes, each of which automatically transitions to the subsequent process based on the information transmitted from the printer 30. The value of the inter-system cooperation flag indicating OFF represents that the process group of interest is a process group composed of manual transition processes, each of which manually transitions to the subsequent process in response to the operation of the user to proceed with the production.

FIG. 7 is a diagram illustrating an example of the file information 10c3. In the file information 10c3, the matter name, file name, delivery date, number of copies, note, active process management ID, and process setting information list are recorded for each file. The file name includes the name of a file registered by the user as the target for process management. The delivery date, number of copies, and note are information set by the user. The delivery date includes the date and time of delivery. The number of copies includes the number of copies to be delivered. The note includes work instructions or complementary information and is used to help the user understand what the target file is like on the process management screen. The matter name, file name, delivery date, number of copies, and note are referred to at the generation of the display data of the matter information portion 100 of the process management screen of FIG. 5.

The active process management ID is the process management ID of the process currently being executed among the processes intended to be executed in the target matter. The process management ID is a process management ID defined in the process list information 10c4. When the process currently being executed is the automatic transition process, upon acquiring, from the printer 30, the information indicating the completion of the process currently being executed, the processor 10a updates the active process management ID to the process management ID of the subsequent process with a disable flag not ON. The disable flag will be described later. When the process currently being executed is the manual transition process, the processor 10a updates the active process management ID in response to the operation of the user to proceed with the production. Specifically, when the terminal 20 detects the operation of the user to proceed with the production, the terminal 20 notifies the server 10 of the process to which the user intends to proceed with the production. The processor 10a of the server 10 determines whether the process to which the user intends to proceed with the production is a process to which the transition can be made next by the operation. When determining that the process to which the user intends to proceed with the production is a process to which the transition can be made next by the operation, the processor 10a sets the active process management ID to the matter management ID of the process to which the user intends to move the matter.

In the process setting information list, the process management ID, the disable flag, and a job information list are recorded for each process to produce a print product of the target matter. The disable flag includes a value indicating whether the target process is intended to be executed for the production based on the target file. For the document file 10c1 of "Eaaa.pdf" in the example of FIG. 7, the disable flag of the process with a process management ID of B2 is ON, and the disable flags of the other processes are OFF. This means that, in the production of print products based on the document file 10c1 of "aaa.pdf", the color-matching process (see FIG. 6) with a process management ID of B2 is not the process intended to be executed.

In the job information list, information concerning a job being executed in the target process is recorded. For a process including a print job being executed, the job information list includes a print job ID, a serial number, print settings, a number of copies, and an estimated print completion time. The print job ID is an identifier to identify the print job. The serial number is a serial number of the printer 30 used in the target print job. The print settings are print setting information used in the target print job. The number of copies is the number of copies to be printed by the target print job. The estimated print completion time is the time the target print job is estimated to be completed. The processor 10a acquires a time required for the print job of the target matter by the printer 30. Specifically, for example, the processor 10a calculates the time required to print per page based on the printing conditions (medium size, print quality, or the like, for example), multiplies the calculated time by the number of pages per copy, and multiplies the result by the number of copies to acquire the time required for the print job. The processor 10a adds the time required for the print job to the current time to calculate the estimated print completion time of the target print job. The estimated print completion time of the target print job is used for the display of the estimated completion time of the printing process in the process management screen of FIG. 5. The calculation of the estimated print completion time and the update of the display thereof may be performed periodically. The calculation of the estimated print completion time and the update of the display thereof may be also performed when the user reloads the process management screen. The estimated print completion time of the print job is recorded in the file information 10c3 when the print job is being executed and the estimated print completion time thereof is calculated. When the print job is completed, the print job ID, serial number, print setting, number of copies, and estimated print completion time thereof are deleted from the file information 10c3.

When the target process includes plural jobs being executed, the print job ID, serial number, print setting, number of copies, and estimated print completion time are recorded for each job. For the document file 10c1 of "eee.pdf" in the example of FIG. 7, the process with a process management ID of B4 (the printing process, see FIG. 6) that currently being executed includes two jobs with print job IDs of "JOB001" and "JOB002". When the same process is executed for plural print jobs, the display of the estimated completion time in the process management screen in FIG. 5 employs the latest one of the estimated print completion times of the print jobs. In the example of FIG. 7, the later one of "17:00" and "17:15" is employed and displayed as the estimated completion time of the printing process for "eee.pdf" in FIG. 5.

FIG. 8 is a diagram illustrating an example of the printer information 10c5. In the printer information 10c5, the current status of each printer 30 used in the production system 1 and the like are recorded. At receiving the information relating to the progress from the printer 30, the processor 10a serves as the acquisition portion 10a1. In the printer information 10c5, a printer name, a model name, a serial number, a status, error information, and notice information are recorded for each printer 30. The printer name is the name of the target printer 30. The model name is the model name of the target printer 30. The serial number is the serial number identifying the target printer 30.

The status is the current status of the target printer 30. The status, such as "printing" or "an error has occurred", is recorded according to the status information that is transmitted from the printer 30 upon a change in the status. The error information is information indicating the content of an error having occurred in the target printer 30. In this embodiment, the error icons take various forms depending on the content of each error. When an error has occurred in the printer 30, the printer 30 notifies the server 10 of the status information of "an error has occurred" together with information indicating the error having occurred. When receiving this information, the processor 10a of the server 10 records an error code indicating the error in the error information of the printer 30. When notified that the error is receive from the printer 30, the processor 10a discards the error code recorded in the error information. The notice information is information indicating the content of a notice having occurred in the target printer 30. When being notified of the notice information from the target printer 30, the processor 10a records the information indicating the content of the notice in the notice information of the printer 30.

3. Display Screen Generation Processing

Next, the processing to generate the process management screen illustrated in FIG. 5 based on the above-described process list information 10c4, file information 10c3, and printer information 10c5 will be described. The processing to update the entire process management screen illustrated in FIG. 5 is executed when the processor 10a receives a request to display (or update) the process management screen from the terminal 20, when the status of any one of the printers 30 has changed, when a certain period of time has elapsed since the previous update of the process management screen, or at any appropriate timing. In the processing to update the entire process management screen, the processor 10a generates the display data for displaying the name of each item ("matter name", "delivery date", "file name", and the like) of the matter information portion 100 and the display data for displaying the name of each item ("prestart", "proofreading", and the like) of the progress chart portion 200.

First, the processing to generate the display data for displaying each item of the matter information portion 100 will be described. With reference to the file information 10c3, for each matter recorded in the file information 10c3, the processor 10a generates the display data for displaying the information corresponding to the matter name, delivery date, file name, number of copies, and note within the respective rectangular regions that are provided for displaying the same (the regions provided under the respective item names in the matter information portion 100). Next, the processing to generate the display data for displaying each item of the progress chart portion 200 will be described. The processor 10a also generates the display data for displaying the same number of rectangular regions as the number of processes for each matter in the progress chart portion 200. In this embodiment, the display data are generated such that the background color of odd-numbered rows be gray and the background color of even-numbered rows be white in both the matter information portion 100 and the progress chart portion 200. The display data for the progress chart portion 200 are generated such that in the odd-numbered rows, the background color of the regions of the automatic transition processes be dark gray and the background color of the regions of the manual transition processes be light gray.

Figure 9:
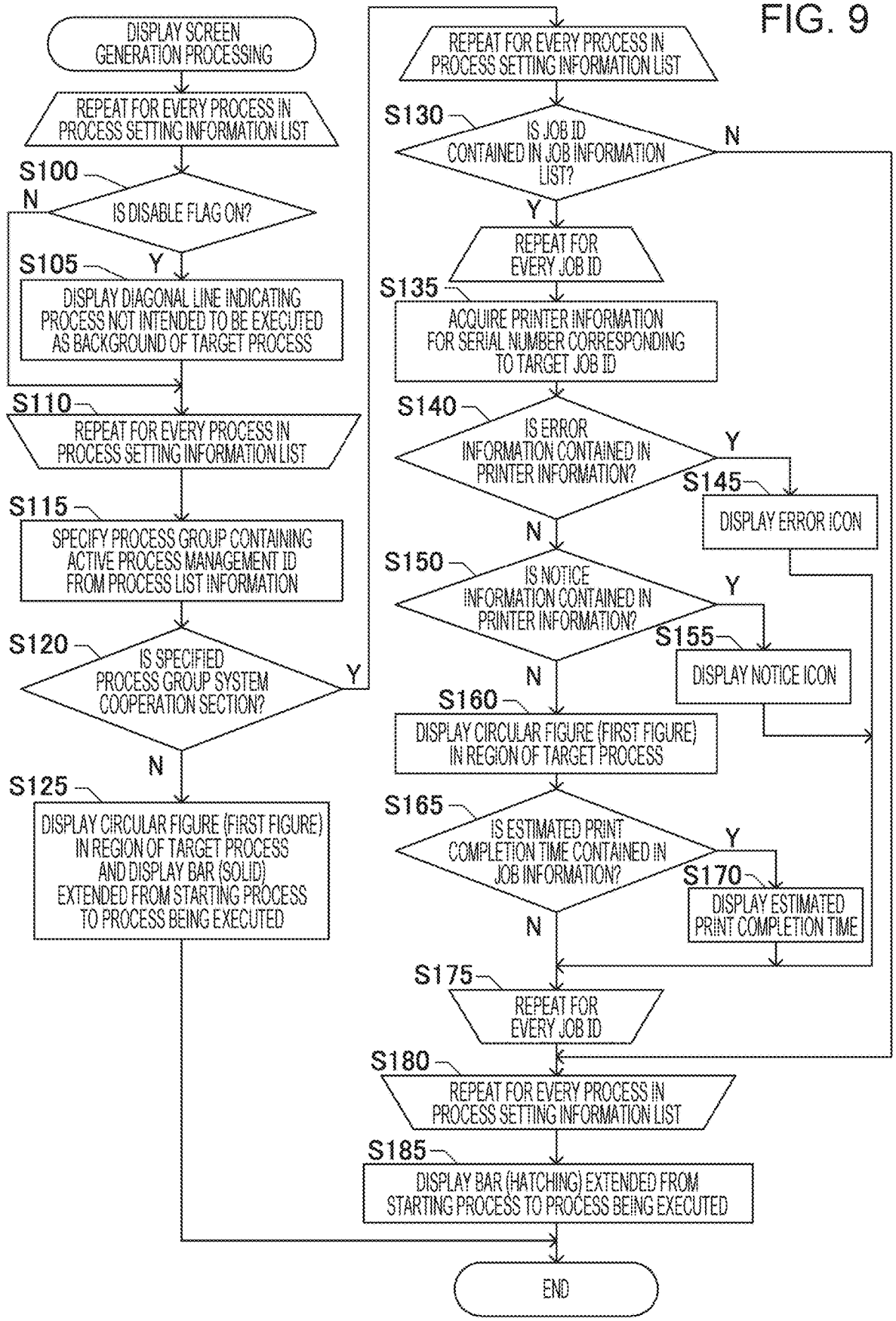
FIG. 9 is a flowchart illustrating display screen generation processing.

The processor 10a executes the display screen generation processing illustrated in FIG. 9 for each matter, in order to generate the display data for displaying the progress chart portion 200 in the matter. Specifically, the display screen generation processing in FIG. 9 is executed for each of the matters, including matter A and matter B, recorded in the file information 10c3 illustrated in FIG. 7. During the display screen generation processing in FIG. 9, the processor 10a serves as the display portion 10a2. When the display screen generation processing is started for a certain matter as the target matter, the processor 10a executes the processing of steps S100 through S110 for one of the processes in the process setting information list of the target matter (file). The processing of steps S100 through S110 is repeated for all the processes in the process setting information list. For example, when the processing in FIG. 9 is being executed for the matter A, the processing of steps S100 through S110 is repeated for elements A1 to C5 in the process setting information list of the matter A, that is, 11 times in total. In step S100, the processor 10a determines whether the disable flag is set in the target process. When the disable flag is set in the target process, the processor 10a generates the display data for displaying a diagonal line indicating the process not intended to be executed as the background of the region of the target process (step S105).

When it is determined in step S110 that the processing of steps S100 is finished for all the processes in the process setting information, the processor 10a acquires from the process list information, a process group containing the process management ID of the process being executed (step S115). Specifically, the processor 10a acquires the active process management ID in the file information 10c3 (see FIG. 7) of the target matter. The processor 10a specifies the process group containing the acquired active process management ID with reference to the process list information 10c4 (see FIG. 6).

Subsequently, the processor 10a determines whether the specified process group is the system cooperation section (step S120). Specifically, with reference to the inter-system cooperation flag of the process group containing the process indicated by the active process management ID in the process list information 10c4 (see FIG. 6), the processor 10a determines whether the inter-system cooperation flag has a value indicating the system cooperation section.

When the specified process group is not determined to be the system cooperation section in step S120, the processor 10a displays a circular figure (the first figure) in the region of the process being executed and displays a bar (solid fill) extending from the region of the starting process to the region of the process being executed (step S125). For example, the display data for displaying the active process icon and solid bar of matter A in FIG. 5 are thus generated. When the process being executed is the completion process, the display data for displaying an icon of a circular figure with a check mark therein are generated. As for matters B, C, K, and L, the display data for displaying the active process icon and solid bar are generated in step S125 of the display screen generation processing in FIG. 9 carried out for each of the matters B, C, K, and L in a similar manner.

When the specified process group is determined to be the system cooperation section in step S120, the processor 10a executes processing of steps S130 through S180 for one process in the process setting information list of the target matter. The processing of steps S130 through S180 is repeated for all the processes in the process setting information list. When the processing of FIG. 9 for the matter A is being executed, for example, the processing of steps S130 through S180 is repeated for the elements A1 to C5 of the process setting information list of the matter A, that is, 11 times in total.

In step S130, the processor 10a determines whether the job information list contains a job ID. Specifically, the processor 10a determines whether the target process is associated with a print job ID in the file information 10c3 (FIG. 7). When the target process is not determined to be associated with a print job ID in step S130, the processor 10a considers that the target process is not the process being executed and proceeds to step S180.

When the target process is determined to be associated with a print job ID in step S130, the processor 10a repeats the processing of steps S135 through S175 as many times as the number of print job IDs. When the target process being executed by one print job, the processing of steps S135 through S175 is executed once. When the target process is being shared and executed by plural print jobs, the processing of steps S135 through S175 is executed as many times as the number of jobs. For example, the process with a management process ID of B4 in FIG. 7 is associated with two print job IDs, and the processing of steps S135 through S175 is therefore repeated twice.

In step S135, the processor 10a acquires printer information for the serial number corresponding to the target print job ID (step S135). That is, the processor 10a specifies the serial number corresponding to the target print job and specifies the printer that matches the specified serial number in the printer information 10c5 (see FIG. 8). To be specific, when the target print job ID is JOB001 of the process with a management process ID of B4 in FIG. 7, for example, the processor 10a specifies the serial number of the printer intended to execute the print job with a print job ID of JOB001. The processor 10a then specifies the printer information (see FIG. 8) of the printer of the specified serial number.

Subsequently, the processor 10a determines whether the printer information contains error information (step S140). Specifically, with reference to the error information of the printer specified in step S135 in the printer information 10c5 (see FIG. 8), the processor 10a determines whether the error information is associated to the target printer 30. When it is determined in step S140 that the printer information contains the error information, the processor 10a generates the display data for displaying an error icon (step S145) and proceeds to step S175. That is, the processor 10a generates the display data for displaying an error icon (for example, $I_{25}$ or $I_{26}$ in FIG. 5) in the region of the target process. The error icon takes a form in accordance with the content (the error type, for example) of the error information recorded in the printer information 10c5.

When it is not determined in step S140 that the printer information contains the error information, the processor 10a determines whether the printer information contains notice information (step S150). Specifically, with reference to the notice information in the printer specified in step S135 in the printer information 10c5 (see FIG. 8), the processor 10a determines whether the notice information is associated to the target printer 30. When it is determined in step S150 that the printer information contains the notice information, the processor 10a generates the display data for displaying a notice icon (step S155) and proceeds to step S175. That is, the processor 10a generates the display data for displaying the notice icon ($I_{27}$ in FIG. 5) in the region of the target process.

When it is not determined that the printer information contains the notice information in step S150, the processor 10a generates the display data for displaying a circular figure (the first figure) in the region of the target process (step S160). When the target process is the printing process, the processor 10a displays a frame emphasizing the outline of the circular figure (the first figure) ($I_{23}$ in FIG. 5).

Subsequently, the processor 10a determines whether the job information contains the estimated print completion time (step S165). Specifically, the processor 10a determines whether any time is recorded as the estimated print completion time of the target print job in the file information 10c3. When it is determined time in step S165 that the job information contains the estimated print completion, the processor 10a generates the display data for displaying the estimated print completion time (step S170) and proceeds to step S175. When the same process is shared and executed by plural print jobs, in step S170, the processor 10a employs the latest one of the estimated print completion times of the plural print jobs as the time to be displayed in the step S170.

In step S175, the processor 10a determines whether the processing of steps S135 through S175 is finished for all the print job IDs. When the processing is not finished, the processor 10a returns to step S135. When it is determined in step S175 that the processing is finished for all the print job IDs, the processor 10a determines whether the processing is finished for all the processes in the process setting information list (step S180). When it is not determined in step S180 that the processing is finished for all the processes in the process setting information list, the processor 10a repeats the processing from step S130 for a process not yet subjected to the processing. When it is determined in step S180 that the processing is finished for all the processes in the process setting information list, the processor 10a generates the display data for displaying the bar (hatching) extended from the region of the starting process to the region of the process being executed (step S185).

The processor 10a repeats the display screen generation processing in FIG. 9 as many times as the number of matters recorded in the file information 10c3 to generate the display data of the progress chart of each matter of the progress chart portion 200. When generating the display data for displaying the entire process management screen of FIG. 5 in such a manner, the processor 10a transmits the display data to the terminal 20. The terminal 20 displays the process management screen on the display 20d based on the transmitted display data.

4. Other Embodiment

The above embodiment is an example for carrying out the present disclosure, and various other embodiments can be adopted. For example, in the above-described embodiment, the server 10 and terminal 20 are composed of different devices. However, the server 10 and terminal 20 may be composed of the same device or may be distributed to three or more devices. The processing illustrated in FIG. 9 may be executed by the terminal 20. Specifically, the server 10 may be configured to provide the latest file information 10c3, process list information 10c4, and printer information 10c5 for the terminal 20 while based on the provided information, the processor 20a of the terminal 20 executes the display screen generation processing.

A matter is a unit to be processed in a plurality of processes, and when the processes corresponding to a matter are completed, a finished product corresponding to the matter is produced. Therefore, a matter is, for example, a unit of an instruction for forming a predetermined finished product by executing processing from the start to the end of one or more processes. The number of finished products to be completed in one matter is not limited and may be one or more. A finished product of each matter is at least an article in a predetermined state, and of course, a finished product may be completed through a process using other finished products produced by plural matters.

The processes corresponding to each matter are work corresponding to at least a part of the processing required to complete the matter, which may be different from matter to matter or may be the same across different matters. The processes may be executed by a device, may be executed by a worker, or may be executed by both. When the processing is executed by a device, the starting instruction of the processing and the information required for the processing are electrically provided. When the processing is executed by a worker, the starting instruction of the processing and the procedure required for the processing are transmitted to the worker.

The progress of processes at least indicates the degree of progress of the processes and may be represented by, for example, information indicating that each process is started, information indicating that each process is finished, information indicating the percentage to which each process has reached, or the like. The form for displaying the progress of each process in the list is not limited to the above-described form and may be configured to indicate the degree of progress numerically.

In the process management screen, the direction in which matters are arranged and the direction in which processes are arranged in execution order may be different from those of the above-described embodiment. The former may be horizontal while the latter is vertical, for example. Furthermore, the time order may also be different from the above-described embodiment.

At displaying the processes waiting to be executed, the processes being executed, the processes already executed, and the processes not intended to be executed in a distinguishable manner for each manner, the display is provided such that the user can comprehend at least the progress of each process and the presence of the process. The form of the display for making each process distinguishable from each other is not limited to the form as described in the above-described embodiment and may have various configurations. For example, it is possible to adopt a configuration in which the processes waiting to be executed, the processes already executed, and the processes not intended to be executed are displayed so as to be distinguished by characters, colors, and various icons.

In a configuration where the processes waiting to be executed, the processes being executed, and the processes already executed are displayed with similar marks in a distinguishable manner while the processes not intended to be executed are displayed with a dissimilar mark to these similar marks, the similar marks can be represented in various forms. For example, in a certain configuration, the similar marks may be different in color and have an identical or similar shape, and the dissimilar mark may have neither an identical shape nor a similar shape to the similar marks. In another configuration, the similar marks may be marks formed by scaling up or down a certain mark while the dissimilar mark may be a mark that does not coincide with the same mark even when scaled up or down.

The processes may be configured such that the administrator can customize the processes by adding or deleting some processes. The pre-printing and post-printing processes may include various processes in addition to the processes described in the above-described embodiment.

Figure 10:
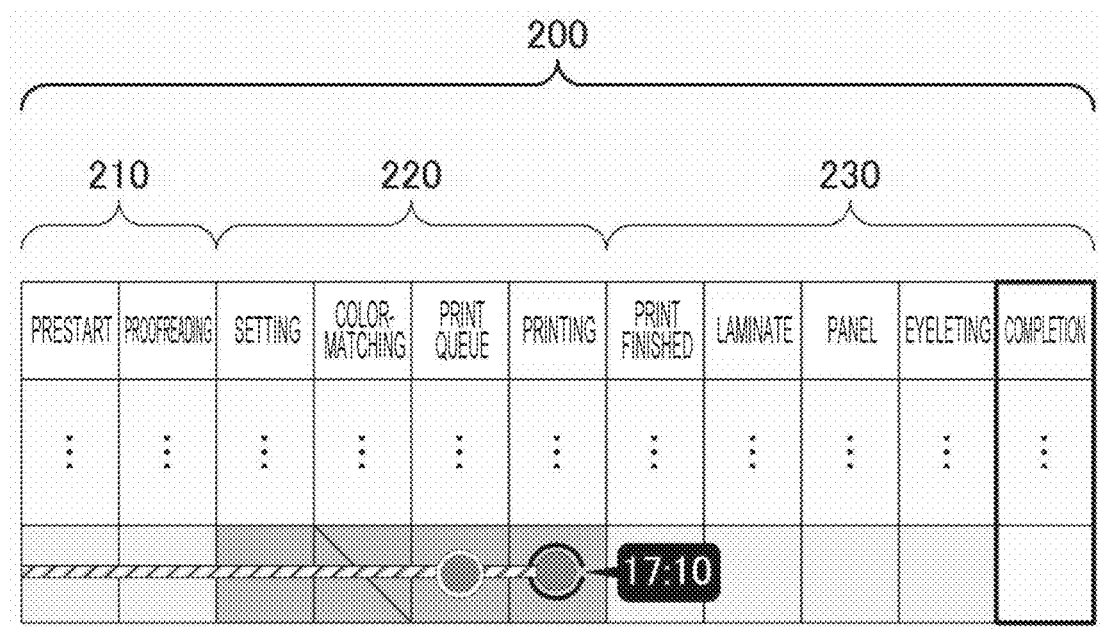
FIG. 10 is a diagram illustrating a display example of a progress chart.

In some cases, plural processes are being executed in parallel for one matter. For example, a matter for delivering 3000 copies is divided into two groups, each for 1500 copies, and is subjected to the processes on the group basis. Such two groups may be subjected to the same process in parallel but also may be subjected to different processes in parallel. The processes that can be executed in parallel for one matter include the print setting process, the color-matching process, the print queue process, and the printing process, which are the automatic transition processes. When plural processes are being executed in parallel for one matter, the active process icons each containing a circular figure (the first figure) are displayed in the respective regions corresponding to the plural processes being executed in parallel. FIG. 10 is a display example when the print queue process and the printing process are being executed in parallel.

The estimated completion time is displayed for each of the processes being executed in parallel, the processes being executed in parallel include the printing process and a first process other than the printing process. When a display area of the estimated completion time of the first process overlaps the display area of the estimated completion time of the printing process, the estimated completion time of the first process is not displayed, and the estimated completion time of the printing process is displayed. For example, in the example illustrated in FIG. 10, the estimated completion time of the print queue process is not displayed, and only the estimated completion time of the printing process as the last process of the process group 220 is displayed. The estimated completion time of the print queue process, for example, may be calculated by adding the current time with the time required for all the print jobs that are stored in the printer assigned to the target print job and are to be processed prior to the target print job.

Next, with reference to FIG. 11, another example of the process management screen will be described. In a process management screen illustrated in FIG. 11, rectangular display boxes $B_{21}$ and $B_{22}$ indicating respective groups are displayed. Herein, a plurality of matters can be classified as a same group, and this group is called a group. In top parts $Bt_{21}$ and $Bt_{22}$ of the display boxes $B_{21}$ and $B_{22}$, the priority level of the matters belonging to each group, the delivery date (deadline), the group name, and the relationship with the delivery date (the number of days remaining) are displayed. In the top parts $Bt_{21}$ and $Bt_{22}$ of the display boxes $B_{21}$ and $B_{22}$, the relationship between the current time and the delivery date is displayed. The priority level is the level of priority in processing the matters and is inputted by the user at registration of each matter, for example.

In each of the display boxes $B_{21}$ and $B_{22}$, a list of information concerning the matters belonging to the corresponding group. The matters belonging to the group are arranged vertically in rows while the processes are arranged horizontally in execution order. That is, in the display boxes $B_{21}$ and $B_{22}$, information of the same matter is arranged horizontally, and information of different matters is arranged vertically. In the leftmost side of the display boxes $B_{21}$ and $B_{22}$, thumbnail icons $I_1$ as previews of the respective matters are displayed, and the matter names thereof are displayed to the right of the respective previews.

The processes of each matter are arranged in execution order, on the right of the preview and matter name. In FIG. 11, the processes are arranged in execution order such that each process be executed prior to the processes on the right thereof. To be specific, in the example illustrated in FIG. 11, the processing is performed in order of the waiting for submission, the print setting, the printing, the surface treatment, and the packing. The texts indicating these processes are arranged in this order from left to right above the display box $B_{21}$. In the example illustrated in FIG. 11, rectangular regions (a region Bf and the like) for displaying information concerning the respective processes are provided under the texts indicating the processes. Under the text indicating each process, information concerning the same process in different matters is arranged vertically. According to such a configuration, the user can comprehend the information for each matter while clearly distinguishing the same. Furthermore, the user can clearly comprehend the execution order of the processes of each matter. The user therefore can easily comprehend how the individual processes of plural matters progress.

As described above, in the example illustrated in FIG. 11, the processes of each matter are horizontally arranged in execution order. In such a screen, the processor 10a displays icons indicating that the processing is being executed, at the position corresponding to the process being executed. The server 10 assigns the processing of the processes to the printers, a surface treatment machine, and the like and gives a starting instruction of the processing thereto. The starting instruction of the processing is given to the device for a process in which the processing can be started by the device being instructed to start the processing, like the printing process carried out by the printer. On the other hand, the starting instruction of the processing is given to a worker for a process in which the processing is started by the worker being instructed to start the processing. For example, it is possible to adopt a configuration in which the starting instruction of the processing is displayed on the terminal 20. This can notify the start of a process to the worker who performs the processing of the process. The worker therefore recognizes the need to start the work of which the worker is in charge.

When the processing of a matter is finished, the printer 30 transmits to the server 10, the information indicating that the processing is finished. The server 10 acquires the information via the communication portion 10*b* and specifies the matter and process for which the processing is finished. In the process in which the information indicating the end of the processing is not outputted from the device that performs the processing, the end of the process is inputted by the worker's predetermined operation. The server 10 acquires the information via the communication portion 10*b* and specifies the matter and process for which the processing is finished.

When any process is finished, it is determined whether there is a process subsequent to the finished process with reference to the file information 10*c*3 of FIG. 7. When there is a subsequent process, an instruction to start the processing of the subsequent process is made. When the processing for each process is started or finished, the server 10 records the process (the active process management ID) for which the processing is started, in the file information 10*c*3. As described above, the processor 10*a* is able to instruct the start of each process or capture the end thereof. The processor 10*a* therefore is able to specify the process currently being executed in each matter. When the process being executed is specified, the processes prior to the specified process are specified as the processes already executed, and the processes following the specified process are specified as the processes waiting to be executed.

When the process being executed in each matter is specified, the processor 10*a* displays an icon indicating that the process is being executed, at the position corresponding to the process being executed. The icon indicating the process being executed may take various forms. In the example illustrated in FIG. 11, black circular icons $I_2$ are the icons indicating the process is being executed. In the example illustrated in FIG. 11, the process being executed in matter X1 is the printing process. In this case, the processor 10*a* displays the icon $I_2$, which indicates the process being executed, in the region Bf corresponding to the printing process that is currently being executed. According to the above configuration, the user can easily comprehend the process currently being executed in each matter.

Furthermore, the processor 10*a* displays for each matter, the processes waiting to be executed, the processes already executed, and the processes not intended to be executed in a distinguishable manner from each other. To be specific, the processor 10*a* also displays icons indicating the process waiting to be executed and indicating the process already executed in the process management screen. The icons indicating the processes waiting to be executed may have various forms. In the example illustrated in FIG. 11, white circular icons $I_3$ are the icons indicating the processes waiting to be executed. In the example illustrated in FIG. 11, the processes waiting to be executed in matter X1 are the surface treatment process and packing process. In the regions corresponding to these processes, the processor 10*a* displays the icons 13, which indicates the processes waiting to be executed.

Figure 11:
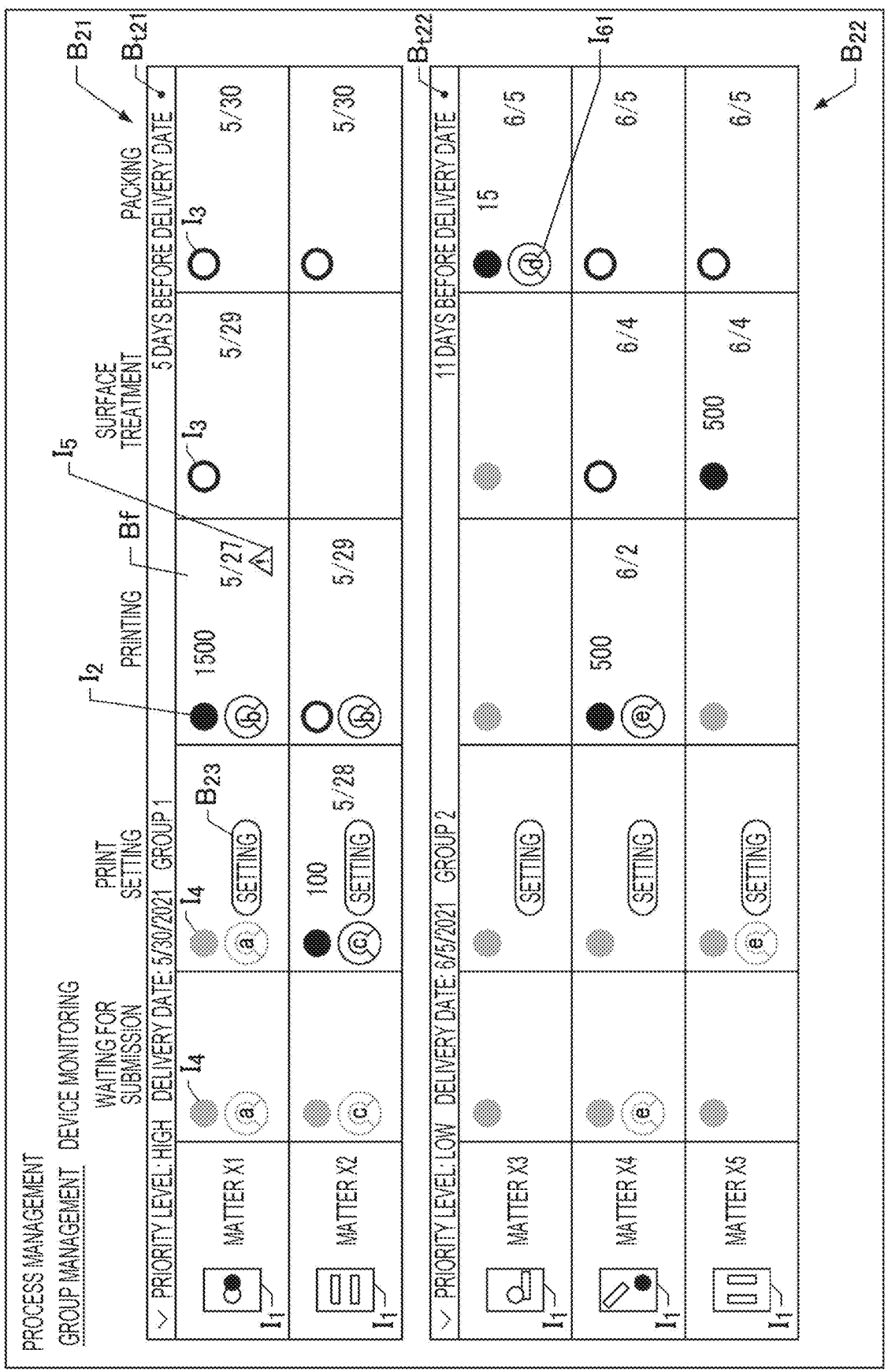
FIG. 11 is a diagram illustrating another example of the process management screen.

In the example illustrated in FIG. 11, gray circular icons 14 are the icons indicating the processes already executed. In the example illustrated in FIG. 11, the processes already executed in matter X1 are the submission waiting process and print setting process. In the regions corresponding to these processes, the processor 10*a* displays the icons 14, which indicate the processes already executed. As described above, in this embodiment, the icons $I_3$, which indicate the processes waiting to be executed, and the icons 14, which indicate the processes already executed, are of the same shape in different colors. The icons $I_3$ and $I_4$ are therefore similar. When similar icons are used as the icons $I_3$, which indicate the processes waiting to be executed, and the icons 14, which indicate the processes already executed, it can be suggested that the icons $I_3$ and $I_4$ have similar meanings (the process is present). Furthermore, since these icons are similar but not the same, it can be suggested that the icons have different meanings (the progresses are different).

In the example illustrated in FIG. 11, any information, such as the circular icons and characters, is not displayed for the process not intended to be executed. Specifically, in the process management screen, framed regions are arranged vertically under the characters indicating the processes, and each region is a part for displaying the information concerning the corresponding process. The processor 10*a* does not display any icons or characters in the regions corresponding to the processes not intended to be executed. According to this configuration, no icons or characters displayed in the regions clearly shows unnecessary processes for producing finished products of each matter.

When the processes waiting to be executed are clearly shown like the above-described configuration, the user can comprehend that these processes will be executed later and can prepare or prevent troubles. When the processes already executed are clearly shown, the user can comprehend that the processes are already executed. The user thereby comprehends that process management is no longer required for these processes in the production of finished products of the target matter. When the processes not intended to be executed are clearly shown, the user can comprehend that process management is not required for the processes in the production of finished products of the target matter.

The process management screen configured as described above is updated according to the progress of processes. Specifically, the processor 20*a* inquires of the server 10 about the process being executed in each matter in response to a predetermined trigger (for example, a periodic trigger or a trigger in response to the start or end of processing in the display portion). When the processor 10*a* of the server 10 transmits the display data for displaying the above-described process management screen in response to the inquiry, the terminal 20 updates the process management screen based on the transmitted information.

When the processing in a certain process is finished and the processing in the subsequent process is started, the icon indicating the process being executed moves to the right region. In the region where the icon indicating the process being executed was previously displayed, the icon indicating the process already executed is displayed. Focusing on the same process in the same matter, the statuses when the process is waiting to be executed, when the process is being executed, and when the process is already executed are displayed with the same figure in different colors. According to the above-described configuration, the user can comprehend the progress of processes in each matter.

The user may be able to perform various operations on the process management screen. For example, the process management screen may be configured such that the user can specify any icon, name, or process of any matter to display the details thereof or modify the setting information. In the process management screen illustrated in FIG. 11, a setting button $B_{23}$ is provided in each region of the print setting process. When the user operates the input portion 20e of the terminal 20 to perform an operation for the setting button $B_{23}$, the processor 10a displays a screen for print setting. The user can perform print setting by using this screen.

In FIG. 11, icons indicating workers are displayed in the regions indicating the processes. The icons in this embodiment are face photographs registered in advance by workers. In FIG. 11, for example, the icon of worker D is schematically illustrated as an icon $I_{61}$. In this embodiment, the icons of the workers associated with the processes being executed and processes waiting to be executed are in normal colors while the icons of the workers associated with the processes already executed, for which the processing is finished, are grayed out.

According to the above-described configuration, the user can comprehend the worker of each process based on the process management screen. Furthermore, when the start of a process is notified to a worker, the worker is displayed in association with the process. The worker therefore can easily comprehend whether the process requires work to be done by the worker from now based on the worker's icon.

Furthermore, the present disclosure is also applicable as a program or a method executed by a computer. The system, the program, and the method as described above may be implemented as a single device or may be implemented by using components included in plural devices, which include various modes. The system, the program, and the method of the present disclosure can be changed as appropriate and may be composed of partly software and partly hardware. The present disclosure is also established as a recording medium of the program that controls the system. Of course, the recording medium of the program may be a magnetic recording medium or may be a semiconductor memory. Any recording medium that will be developed in the future can be considered in exactly the same way.

The above-described embodiment does not limit the present disclosure. Since the embodiments contain a plurality of disclosures having different effects, one problem or effect read from the embodiments is not always the problem or effect for all the disclosures contained in the embodiments.

What is claimed is:

1. A display screen generation apparatus comprising:
a processor; and
a memory including one or more programs stored thereon that, when executed by the processor, cause the display screen generation apparatus to function as:
an acquisition portion acquiring for each of a plurality of print jobs progressed through a plurality of processes, progress of the processes; and
a display portion generating a display screen that displays for each of the plurality of print jobs, the process waiting to be executed, the process being executed, the process already executed, and the process not intended to be executed in a distinguishable manner from each other, wherein
regions indicating the plurality of processes are arranged in execution order of the processes,
in the region indicating the process being executed, a first figure indicating that the corresponding process is being executed is displayed, and
the region indicating the process not intended to be executed is displayed in a form indicating that the corresponding process is not intended to be executed.

2. The display screen generation apparatus according to claim 1, wherein
for the same process, statuses when the process is waiting to be executed, when the process is being executed, and when the process is already executed are displayed with a same shape and different colors from each other.

3. The display screen generation apparatus according to claim 1, wherein
when the process being executed is a printing process, a frame emphasizing the outline of the first figure is displayed.

4. The display screen generation apparatus according to claim 3, wherein
an estimated completion time of the printing process is displayed in a predetermined display area corresponding to the first figure.

5. The display screen generation apparatus according to claim 4, wherein
when some of the processes are being executed in parallel for a file, the first figure is displayed in each of the regions corresponding to the processes being executed in parallel.

6. The display screen generation apparatus according to claim 5, wherein
the processes configured to be executed in parallel include a print setting process, a color-matching process, a print queue process, and the printing process.

7. The display screen generation apparatus according to claim 6, wherein
an estimated completion time is displayed for each of the processes being executed in parallel,
the processes being executed in parallel include the printing process and a first process other than the printing process, and
when a display area of the estimated completion time of the first process overlaps the display area of the estimated completion time of the printing process, the estimated completion time of the first process is not displayed, and the estimated completion time of the printing process is displayed.

8. The display screen generation apparatus according to claim 2, wherein
when an error occurs in the process being executed, a figure indicating the error is displayed in the region indicating the process being executed.

9. The display screen generation apparatus according to claim 2, wherein
when an event to be notified to a user occurs in the process being executed, a figure indicating the presence of information to be notified is displayed in the region indicating the process being executed.

10. A display apparatus comprising:
a processor; and
a memory including one or more programs stored thereon that, when executed by the processor, cause the display apparatus to function as:
an acquisition portion acquiring for each of a plurality of print jobs progressed through a plurality of processes, progress of the processes; and a display portion displaying for each of the plurality of print jobs, the process waiting to be executed, the process being executed, the process already executed, and the process not intended to be executed in a distinguishable manner from each other, wherein regions indicating the plurality of processes are arranged in execution order of the processes, in the region indicating the process being executed, a first figure indicating that the corresponding process is being executed is displayed, and the region indicating the process not intended to be executed is displayed in a form indicating that the corresponding process is not intended to be executed.

11. A display screen generation method, comprising:

acquiring for each of a plurality of print jobs progressed through a plurality of processes, progress of the processes; and generating a display screen that displays for each of the plurality of print jobs, the process waiting to be executed, the process being executed, the process already executed, and the process not intended to be executed in a distinguishable manner from each other, wherein regions indicating the plurality of processes are arranged in execution order of the processes, in the region indicating the process being executed, a first figure indicating that the corresponding process is being executed is displayed, and the region indicating the process not intended to be executed is displayed in a form indicating that the corresponding process is not intended to be executed.

12. A non-transitory computer-readable storage medium storing a display screen generation program, the program causing a computer to function as:

an acquisition portion acquiring for each of a plurality of print jobs progressed through a plurality of processes, progress of the processes; and a display portion generating a display screen that displays for each of the plurality of print jobs, the process waiting to be executed, the process being executed, the process already executed, and the process not intended to be executed in a distinguishable manner from each other, wherein regions indicating the plurality of processes are arranged in execution order of the processes, in the region indicating the process being executed, a first figure indicating that the corresponding process is being executed is displayed, and the region indicating the process not intended to be executed is displayed in a form indicating that the corresponding process is not intended to be executed.

* * * * *